United States Patent
Pedersen

(10) Patent No.: US 9,832,022 B1
(45) Date of Patent: Nov. 28, 2017

(54) SYSTEMS AND METHODS FOR PERFORMING REVERSE ORDER CRYPTOGRAPHIC OPERATIONS ON DATA STREAMS

(71) Applicant: Altera Corporation, San Jose, CA (US)

(72) Inventor: Bruce Pedersen, Sunnyvale, CA (US)

(73) Assignee: Altera Corporation, San Jose, CA (US)

( * ) Notice: Subject to any disclaimer, the term of this patent is extended or adjusted under 35 U.S.C. 154(b) by 218 days.

(21) Appl. No.: 14/632,496

(22) Filed: Feb. 26, 2015

(51) Int. Cl.
*H04L 29/06* (2006.01)
*H04L 9/32* (2006.01)
*G06F 21/76* (2013.01)
*H04L 9/06* (2006.01)

(52) U.S. Cl.
CPC ............ *H04L 9/3236* (2013.01); *G06F 21/76* (2013.01); *H04L 9/0618* (2013.01)

(58) Field of Classification Search
None
See application file for complete search history.

(56) References Cited

U.S. PATENT DOCUMENTS

| | | | |
|---|---|---|---|
| 5,619,571 A * | 4/1997 | Sandstrom | G06F 21/6209 380/200 |
| 6,654,889 B1 | 11/2003 | Trimberger | |
| 7,058,177 B1 | 6/2006 | Trimberger et al. | |
| 7,117,373 B1 | 10/2006 | Trimberger et al. | |
| 7,606,362 B1 | 10/2009 | Streicher et al. | |
| 8,386,800 B2 | 2/2013 | Kocher et al. | |
| 8,650,409 B1 | 2/2014 | Reese et al. | |
| 8,750,503 B1 | 6/2014 | Streicher et al. | |
| 8,826,038 B1 | 9/2014 | Langhammer et al. | |
| 9,146,950 B1 * | 9/2015 | Cooley | G06F 21/64 |
| 2002/0199110 A1 | 12/2002 | Kean | |
| 2003/0212893 A1 * | 11/2003 | Hind | H04L 9/3236 713/177 |
| 2005/0226419 A1 * | 10/2005 | Smathers | H04L 9/0643 380/259 |
| 2009/0226144 A1 * | 9/2009 | Kawamura | G11B 27/105 386/248 |
| 2010/0299443 A1 * | 11/2010 | Hu | H04N 7/165 709/231 |

(Continued)

Primary Examiner — Christopher Revak
(74) Attorney, Agent, or Firm — Treyz Law Group, P.C.; Michael H. Lyons; Tianyi He

(57) ABSTRACT

Integrated circuits may be programmed using configuration data to implement desired custom logic functions. The configuration data may be generated using a logic design system in the form of a configuration bit stream. The logic design system may generate a hash value for the stream by performing multiple hashing operations on the stream in a direction from a trailing end to a leading end of the stream in a reverse direction with respect to the order of the stream. The system may append the generated hash value to the leading end of the stream, may encrypt the hash value, and may provide the stream to an integrated circuit. The integrated circuit may decrypt or otherwise authenticate the hash value, may generate multiple test hash values for the stream and may compare the test hash values to hash values in the stream to determine whether the stream is authentic.

23 Claims, 12 Drawing Sheets

(56) References Cited

U.S. PATENT DOCUMENTS

2014/0280752 A1* 9/2014 Seastrom ............ H04L 67/1002
709/219
2015/0372807 A1* 12/2015 Khoyi .................... H04L 63/04
713/150

* cited by examiner

SYSTEMS AND METHODS FOR PERFORMING REVERSE ORDER CRYPTOGRAPHIC OPERATIONS ON DATA STREAMS

BACKGROUND

This relates to integrated circuits and more particularly, to circuitry for configuring logic on integrated circuits such as programmable integrated circuits.

Programmable integrated circuits are a type of integrated circuit that can be programmed by a user to implement a desired custom logic function. In a typical scenario, a logic designer uses computer-aided design tools to design a custom logic circuit that performs custom logic functions. When the design process is complete, the computer-aided design tools generate configuration data. The configuration data is loaded into memory elements to configure the devices to perform the functions of the custom logic circuit. Memory elements are often formed using random-access-memory (RAM) cells. Because the RAM cells are loaded with configuration data during device programming, the RAM cells are sometimes referred to as configuration memory or configuration random-access-memory cells (CRAM).

Configuration data may be supplied to a programmable device in the form of a configuration bit stream. In order to maintain the security and privacy of custom logic functions specified by the configuration data bit stream, the configuration data bit stream is often encrypted so that the programmable logic circuitry needs to decrypt the encrypted bit stream to verify the authenticity of the bit stream. In typical logic design systems, the entire configuration data bit stream is encrypted and subsequently signed using a cryptographic signature. The cryptographic signature is typically generated by hashing the entire encrypted message using either a keyed cryptographic hash function, such as a Hash Message Authentication Code (HMAC) function, or by hashing the entire encrypted bit stream using a non-keyed cryptographic hash function and subsequently signing the resulting hash tag with a privately keyed asymmetric cryptographic function. Once the hashed and encrypted bit stream is received at the programmable logic device, the logic device creates an internal signature for the received encrypted bit stream using the same hashing and signing cryptographic operations that were used to create the original signature. The logic device only decrypts and loads the received bit stream into memory if the internal signature matches the received signature.

However, in these scenarios, the entire bit stream needs to be buffered onto the programmable logic device so that the necessary hashing and authentication operations are performed before decrypting and loading any portion of the encrypted bit stream into the memory of the logic device. The buffer circuitry required to perform such operations can consume valuable chip area on the programmable logic device which undesirably limits the ability of the programmable logic device to implement custom logic functions.

It may therefore be desirable to be able to provide logic design systems and programmable logic devices with improved configuration data authentication capabilities.

SUMMARY

An integrated circuit may include memory elements arranged in rows and columns and may collectively be referred to as a memory array. The integrated circuit may be a programmable integrated circuit that can be programmed (e.g., using configuration data) by a user to implement desired custom logic functions. The configuration data may be generated using a logic design system in the form of a configuration bit stream. The logic design system may include data stream generation circuitry that generates a configuration data bit stream for the programmable integrated circuit.

The data stream generation circuitry may receive a stream of data bits (e.g., a configuration data bit stream) having a leading end followed by a trailing end (e.g., from external circuitry, a user, a logic designer, etc.). The data stream generation circuitry may include an authentication engine that generates a hash value for the stream of data bits. The hash value may be generated by performing multiple hashing operations on the stream of data bits in a direction from the trailing end to the leading end of the stream of data bits (e.g., in a reverse direction with respect to the order of the stream). The authentication engine may append the generated hash value to the leading end of the stream of data bits.

The authentication engine may partition the stream of data bits into a number of equally sized authentication blocks (e.g., at least first and second authentication blocks). The first authentication block may be located at the leading end of the stream, whereas the second authentication block may be located at the trailing end of the stream, for example. The authentication engine may generate an additional hash value based on at least the second authentication block (e.g., by performing a hash function that takes the second authentication block as its input) and may generate the hash value that is appended to the leading end of the stream based on at least the additional generated hash value.

The authentication engine may encrypt (sign) the hash value appended to the leading end of the stream using a cryptographic key (e.g., a private key of an asymmetric key pair). The authentication engine may, if desired, encrypt the authentication blocks of the stream using additional keys that are different from the key used to sign the appended hash value. The authentication engine may generate multiple additional hash values such that the multiple additional hash values are interspersed amongst the stream of data bits and may generate the hash value based on each of the additional hash values.

As one example, the authentication engine may partition a configuration data bit stream for programming a programmable logic device (e.g., integrated circuit) into at least first and second consecutive authentication blocks. The authentication engine may generate a first authentication tag (hash value) for the second authentication block by performing a hashing operation on at least the second authentication block and may generate a second authentication tag for the first authentication block by performing the hashing operation on the first authentication tag and the first authentication block. The engine may provide the second authentication tag to the programmable integrated circuit and may provide the first authentication block to the integrated circuit subsequent to providing the second authentication tag to the integrated circuit (e.g., in an order opposite to the direction of hashing that was performed to create the authentication blocks).

The integrated circuit may receive a first hash value of a configuration data bit stream (e.g., after processing by the authentication engine), may receive an authentication block of the data stream subsequent to receiving the first hash value, and may receive a second hash value of the data stream subsequent to receiving the authentication block. The integrated circuit may perform a hashing operation on the received authentication block and the received second hash value to generate a test hash value and may compare the test hash value to the received first hash value to determine whether the authentication block is authentic. If desired, the integrated circuit may authenticate the first hash value using a cryptographic authentication algorithm.

The integrated circuit may identify the authentication block as authentic when the test hash value matches the received first hash value and may identify the authentication block as inauthentic when the test hash value is different from the received first hash value. As the integrated circuit continues to receive the configuration data bit stream, the integrated circuit may receive an additional authentication block of the data stream subsequent to receiving the second hash value and a third hash value of the data stream subsequent to receiving the additional authentication block. In response to identifying that the authentication block is authentic, the integrated circuit may perform the hashing operation on the additional authentication block and the received third hash value to generate an additional test hash value and may compare the additional test hash value to the received third hash value to determine whether the additional authentication block is authentic (e.g., without the need for decrypting the third hash value). In this way, the integrated circuit may verify that authentic configuration data has been received from a trusted and authorized source prior to using the configuration data to implement custom logic functions.

Further features of the present invention, its nature and various advantages will be more apparent from the accompanying drawings and the following detailed description.

DETAILED DESCRIPTION

Embodiments of the present invention relate to integrated circuits and more particularly, to integrated circuits with memory elements. Integrated circuits that contain memory elements may include memory chips, digital signal processing circuits, microprocessors, application specific integrated circuits (ASICs), application specific standard products (ASSPs), programmable integrated circuits such as programmable array logic (PAL), programmable logic arrays (PLAs), field programmable logic arrays (FPGAs), electrically programmable logic devices (EPLDs), electrically erasable programmable logic devices (EEPLDs), logic cell arrays (LCAs), field programmable gate arrays (FPGAs), or other suitable integrated circuits.

Integrated circuits such as programmable integrated circuits use programmable memory elements to store configuration data. During programming of a programmable integrated circuit, configuration data is loaded into the memory elements. During normal operation of the programmable integrated circuit, each memory element provides a static output signal. The static output signals that are supplied by the memory elements serve as control signals. These control signals are applied to programmable logic on the integrated circuit to customize the programmable logic to perform a desired logic function.

Memory elements may be organized in arrays having numerous rows and columns. For example, memory array circuitry may be formed in hundreds or thousands of rows and columns on a programmable logic device integrated circuit. Programmable integrated circuit 10 of FIG. 1 is an example of an illustrative integrated circuit on which memory array circuitry may be formed.

Figure 1:
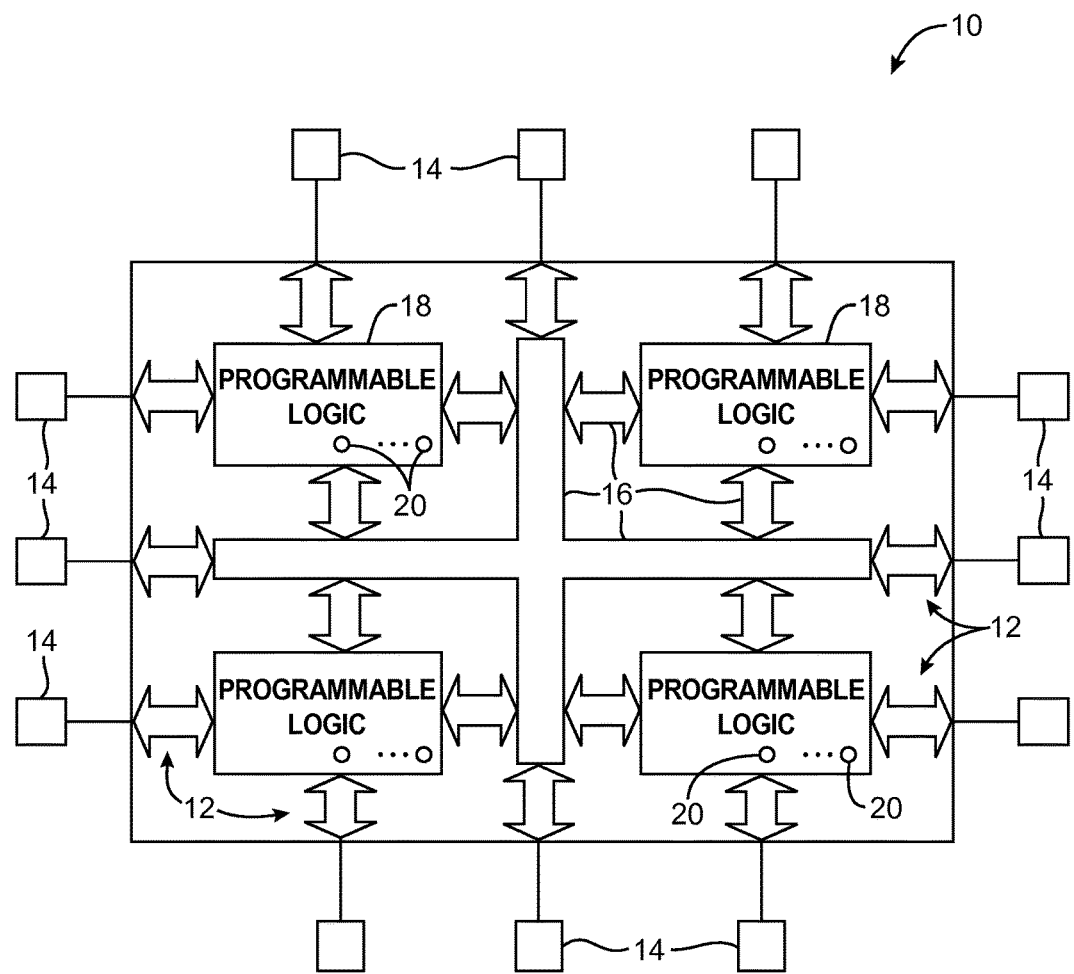
FIG. 1 is a diagram of an illustrative programmable integrated circuit in accordance with an embodiment of the present invention.

As shown in FIG. 1, programmable integrated circuit 10 may have input-output circuitry 12 for driving signals off of device 10 and for receiving signals from other devices via input-output pins 14. Interconnection resources 16 such as global and local vertical and horizontal conductive lines and buses may be used to route signals on device 10. Interconnection resources 16 include fixed interconnects (conductive lines) and programmable interconnects (i.e., programmable connections between respective fixed interconnects). Programmable logic 18 may include combinational and sequential logic circuitry. The programmable logic 18 may be configured to perform a custom logic function.

Programmable integrated circuit 10 contains memory elements 20 that can be loaded with configuration data (also called programming data) using pins 14 and input-output circuitry 12. Once loaded, the memory elements each provide a corresponding static control output signal that controls the state of an associated logic component in programmable logic 18. Typically the memory element output signals are used to control the gates of metal-oxide-semiconductor (MOS) transistors. Some of the transistors may be p-channel metal-oxide-semiconductor (PMOS) transistors. Many of these transistors may be n-channel metal-oxide-semiconductor (NMOS) pass transistors in programmable components such as multiplexers. When a memory element output is high, an NMOS pass transistor controlled by that memory element will be turned on to pass logic signals from its input to its output. When the memory element output is low, the pass transistor is turned off and does not pass logic signals.

A typical memory element 20 is formed from a number of transistors configured to form cross-coupled inverters. Other arrangements (e.g., cells with more distributed inverter-like circuits) may also be used. With one suitable approach, complementary metal-oxide-semiconductor (CMOS) integrated circuit technology is used to form the memory elements 20, so CMOS-based memory element implementations are described herein as an example. In the context of programmable integrated circuits, the memory elements store configuration data and are therefore sometimes referred to as configuration random-access memory (CRAM) cells.

Figure 2:
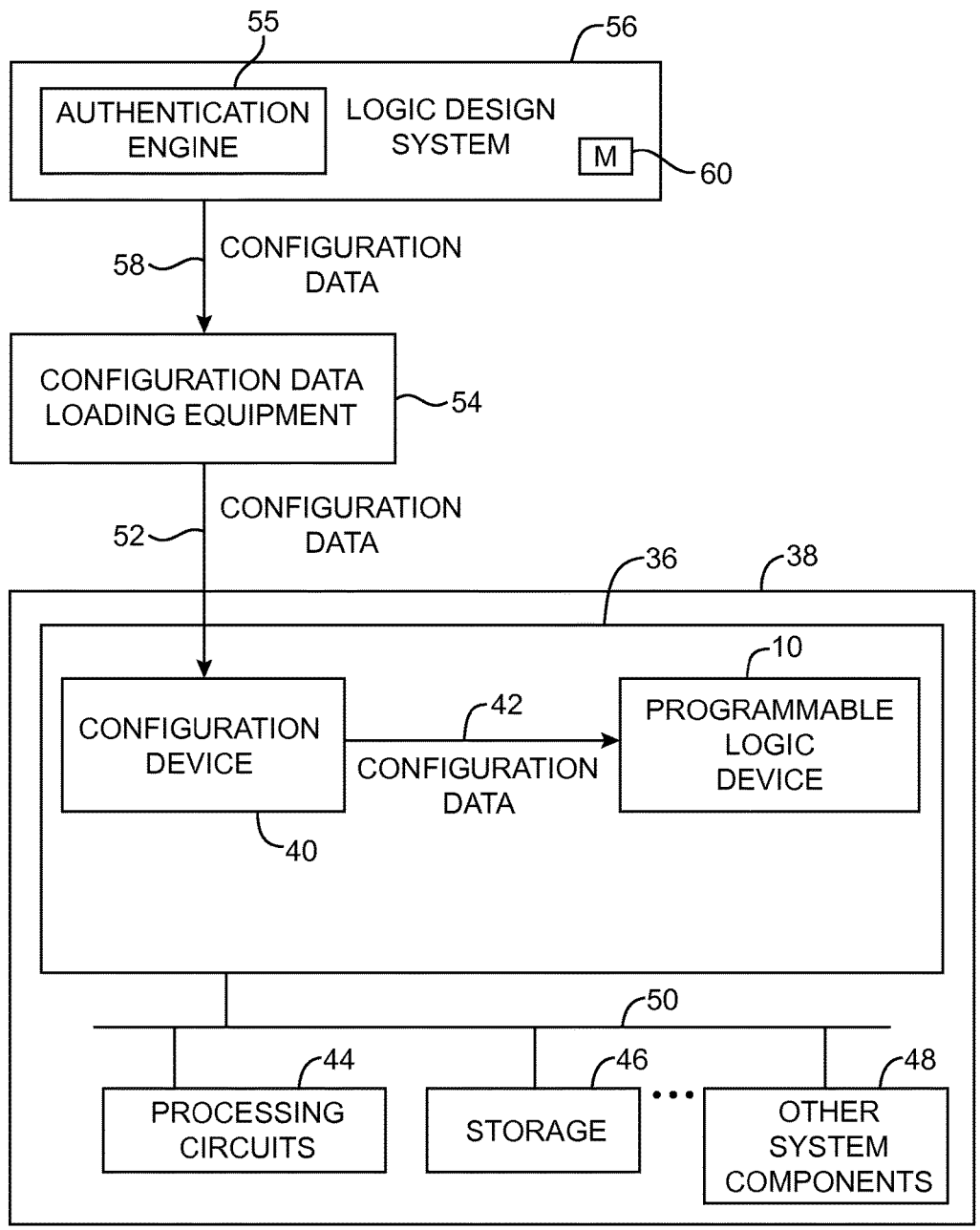
FIG. 2 is a diagram showing how a configuration data bit stream may be created by a logic design system and loaded into a programmable device to configure the device for operation in a system in accordance with an embodiment of the present invention.

An illustrative system environment for device 10 is shown in FIG. 2. Device 10 may, for example, be mounted on a board 36 in a system 38. In general, programmable logic device 10 may receive configuration data from programming equipment or from other suitable equipment or device. In the example of FIG. 2, programmable logic device 10 is the type of programmable logic device that receives configuration data from an associated integrated circuit 40. With this type of arrangement, circuit 40 may, if desired, be mounted on the same board 36 as programmable logic device 10. Circuit 40 may be an erasable-programmable read-only memory (EPROM) chip, a programmable logic device configuration data loading chip with built-in memory (sometimes referred to as a configuration device), or other suitable device. When system 38 boots up (or at another suitable time), the configuration data for configuring the programmable logic device may be supplied to the programmable logic device from device 40, as shown schematically by path 42. The configuration data that is supplied to the programmable logic device may be stored in the programmable logic device in its configuration random-access-memory elements 20.

System 38 may include processing circuits 44, storage 46, and other system components 48 that communicate with device 10. The components of system 38 may be located on one or more boards such as board 36 or other suitable mounting structures or housings and may be interconnected by buses and other electrical paths 50. If desired, programmable device 10 may be loaded with configuration data without mounting device 10 and/or configuration device 40 to board 36 (e.g., using any desired configuration data loading equipment).

Configuration device 40 may be supplied with the configuration data for device 10 over a path such as path 52. Configuration device 40 may, for example, receive the configuration data from configuration data loading equipment 54 or other suitable equipment that stores this data in configuration device 40. Device 40 may be loaded with data before or after installation on board 36.

It can be a significant undertaking to design and implement a desired (custom) logic circuit in a programmable logic device. Logic designers therefore generally use logic design systems based on computer-aided-design (CAD) tools to assist them in designing circuits. A logic design system can help a logic designer design and test complex circuits for a system. When a design is complete, the logic design system may be used to generate configuration data for electrically programming the appropriate programmable logic device.

As shown in FIG. 2, the configuration data produced by a logic design system 56 may be provided to equipment 54 over a path such as path 58. The equipment 54 provides the configuration data to device 40, so that device 40 can later provide this configuration data to the programmable logic device 10 over path 42. System 56 may be based on one or more computers and one or more software programs. System 56 may sometimes be referred to herein as logic design circuitry or data stream generation circuitry that receives a stream of data bits from a logic designer or other external circuitry and that provides the stream of data bits to an external integrated circuit (e.g., programmable logic device 10). In general, software and data may be stored on any computer-readable medium (storage) in system 56 and is shown schematically as storage 60 in FIG. 2.

In a typical scenario, logic design system 56 is used by a logic designer to create a custom circuit (logic) design. The system 56 produces corresponding configuration data which is provided to configuration device 40. Upon power-up, configuration device 40 and data loading circuitry on programmable logic device 10 is used to load the configuration data into CRAM cells 20 of device 10. Device 10 may then be used in normal operation of system 38.

Configuration data loaded onto CRAM cells 20 may include configuration data bits provided by configuration device 40 to programmable device 10 as a stream of configuration data bits (sometimes referred to herein as a configuration data bit stream, a configuration bit stream, or a bit stream) that configure adders and other circuits on device 10 to implement desired custom logic designs and functions. The bits of the configuration data bit stream may be generated by logic design system 56 and may be received at logic device 10 in a series over time (e.g., in a serial order from a first/leading bit of the bit stream to a last/trailing bit of the bit stream over time). Each bit of the serial configuration data bit stream may be a logic "1" (high) bit or a logic "0" (low) bit. Configuration data bit streams loaded onto programmable device 10 typically include a large number of bits (e.g., the bit streams may be hundreds of millions of bits in length or may have any other desired length).

When generating custom logic functions for use on device 10, it may be desirable for a user of design system 56 to maintain the security and privacy of the custom logic functions specified by the configuration data bit stream (e.g., to keep the custom logic functions secret so that the custom logic functions are not accessed or copied by unauthorized users). In order to maintain the secrecy of the custom logic functions (which may sometimes be collectively referred to as intellectual property (IP) blocks or elements), the configuration data bit stream generated by logic design system 56 may be encrypted using a desired cryptographic algorithm or function. Such encryption may scramble the configuration data bit stream so that it is not readable without the appropriate cryptographic key. If desired, programmable logic device 10 may perform authentication operations on configuration data received from configuration device 40 to verify that the received bit stream is authentic (e.g., to verify that the desired bit stream was generated by logic design system 56 instead of an unauthorized logic design system or to verify that the desired bit stream has not been manipulated by unauthorized users).

Logic design system 56 may include authentication equipment such as authentication engine 55. Authentication engine 55 may be formed on design system 56 and/or loading equipment 54 (e.g., authentication may be implemented on storage and processing circuitry associated with logic design system 56). In another suitable arrangement, authentication engine 55 may be formed on a dedicated system (e.g., dedicated computing equipment and/or software) that is separate from logic design system 56. If desired, logic engine 55 may include cryptographic processing circuitry such as an encryption engine for encrypting and/or digitally signing the configuration data prior to providing the configuration data to loading equipment 54. The cryptographic circuitry on engine 55 may digitally sign the configuration data stream using a digital signature (e.g., a cryptographic key). Configuration data bit streams generated by system 56 may include plaintext bits prior to encrypting the bit stream and may include corresponding ciphertext bits after encrypting or digitally signing the bit stream.

In some scenarios, encryption of the configuration data may be performed using a so-called block cipher such as the Advanced Encryption Standard (AES), in which the configuration data bit stream is partitioned into plaintext blocks of a fixed size, which are encrypted to generate ciphertext blocks of the fixed size (e.g., 128-bits). The block cipher may be performed in accordance with the National Institute of Standards and Technology (NIST) Counter Mode of operation in which each ciphertext block is generated by performing an exclusive-OR (XOR) logic operation on the corresponding plaintext block of the bit stream and a corresponding key stream block of a key stream (e.g., a stream of bits associated with a cryptographic key used by engine 55 for performing cryptographic functions).

Engine 55 and device 10 may perform authentication operations on the bit stream to ensure that the bit stream received by programmable device 10 has not been inappropriately manipulated or replaced by a different (e.g., unauthorized) bit stream between generation of the bit stream at design system 56 and loading of the bit stream onto programmable device 10. For example, authentication engine 55 may digitally sign the bit stream (e.g., a ciphertext version of the bit stream or a plaintext version of the bit stream) using a digital signature of the logic designer associated with system 56. The digital signature of the bit stream may be verified (authenticated) at programmable logic device 10 to ensure that the received bit stream was signed by an authorized user such as a user of design system 56). After the digital signature has been verified, programmable logic device 10 may proceed with configuring programmable logic on device 10 using the verified bit stream. Such authentication operations may, for example, mitigate certain types of cryptographic attacks on the bit stream such as side-channel attacks (e.g., Differential Power Attacks, etc.).

In one possible scenario, authentication engine 55 may perform authentication using a NIST Hash Message Authentication Code (HMAC) mode of authentication, in which a secret HMAC key is used to authenticate the bit stream. In another possible scenario, authentication engine 55 may perform authentication operations using asymmetric public key cryptography (e.g., elliptic curve cryptography) to encrypt a cryptographic hash of the bit stream using an asymmetric private key to create the digital signature. The cryptographic hash may be generated using a cryptographic hash function that receives at its input one or more portions of the bit stream and maps those portions of the bit stream to digital data of a predetermined size. The cryptographic hash function may be reproducible and irreversible. In other words, applying a given hash function to two desired input values will always produce the same output value (sometimes referred to as a hash value, hash code, or hash tag), whereas the output value cannot be used to retrieve the two input values that generated the output using the hash function. Applying a cryptographic hash function to an input value may sometimes be referred to herein as "hashing" the input value. The encrypted hash of the bit stream may be decrypted or otherwise authenticated at device 10 (e.g., using a desired cryptographic authentication algorithm such as an algorithm that uses a public key corresponding to the private key used to create the digital signature).

Performing asymmetric key cryptography to verify the bit stream may be relatively slow (e.g., compared to symmetric key cryptography in which the same key is used to encrypt and decrypt the bit stream) and may require buffering large portions of the bit stream, which consumes excessive resources and valuable area on the programmable logic device. In some scenarios, the speed of authentication may be increased by encrypting a single hash of the entire bit stream and decrypting or otherwise authenticating the hash (e.g., using a symmetric cryptographic key) while the bit stream is being loaded into device 10. However, such an approach requires some or all of the bit stream decryption to occur before the authentication signature has been validated (thereby compromising the authenticity of the bit stream). In yet another scenario, the bit stream may be partitioned into multiple segments and each segment may be hashed and publically signed independently. However, in such a scenario, each segment may be relatively large and would still need to be buffered on device 10 (consuming valuable device area) if the segment is to be authenticated prior to being decrypted or otherwise authenticated (e.g., to ensure the authenticity of the bit stream). It may therefore be desirable to be able to provide the logic design system and programmable logic device with improved configuration data bit stream authentication and cryptographic capabilities.

Figure 3:
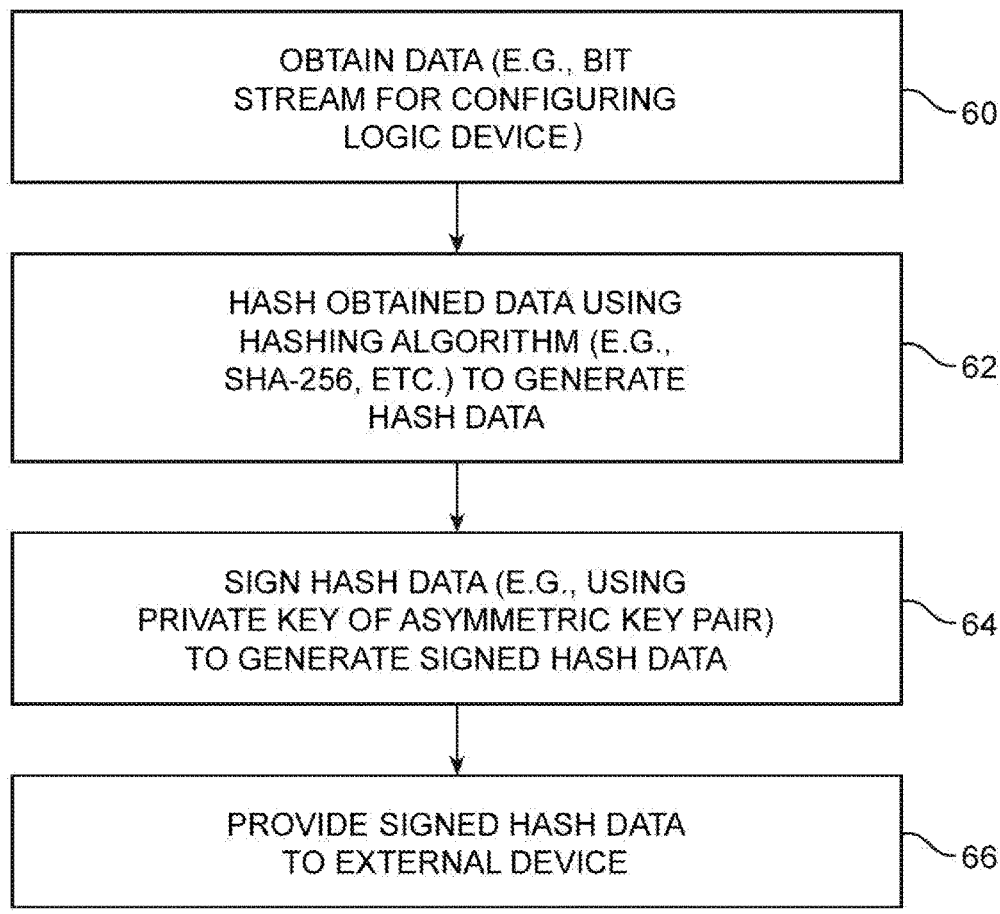
FIG. 3 is a flow chart of illustrative steps that may be performed by an authentication engine on a logic design system of the type shown in FIG. 2 for generating a signed hash data stream for a given configuration data bit stream in accordance with an embodiment of the present invention.

FIG. 3 is a flow chart of illustrative steps that may be performed by logic design system 56 for generating digitally signed data for device 10. The digitally signed data may be processed at device 10 to determine the authenticity of the data and, if the data is authenticated, may be used to configure logic circuitry on device 10.

At step 60, design system 56 may obtain data for digitally signing. For example, design system 56 may obtain a configuration data bit stream associated with one or more custom logic designs to be implemented on device 10 (e.g., as specified by a logic designer or user of system 56).

At step 62, authentication engine 55 may hash the obtained data to generate hash data. For example, engine 55 may perform a cryptographic hashing operation on the obtained configuration data bit stream to generate the hash data (e.g., engine 55 may perform a hash function of the data to generate the hashed data). Any desired hash function may be used to hash the obtained data (e.g., the hash function may be reproducible and irreversible). For example, engine 55 may apply a Secure Hash Algorithm (SHA) such as SHA-256 to the obtained data to generate the hashed data. By hashing the bit stream, the configuration data may be secure from interception and inspection by unauthorized devices/users between design system 56 and device 10.

If desired, engine 55 may hash the bit stream using a hash function that takes as its input one or more portions of the bit stream. If desired, engine 55 may perform multiple hashing operations on different portions of the bit stream to generate multiple different hash values. The multiple hashing operations may take as an input portions of the bit stream and/or portions of previously-generated hash values to generate additional hash values. Engine 55 may intersperse the generated hash values within the bit stream. After hashing the bit stream, the bit stream may be sometimes referred to herein as hash data and may include portions of the original bit stream interspersed with the generated hash values (sometimes referred to herein as hash tags or authentication tags).

At step 64, authentication engine 55 may digitally sign the hash data using a cryptographic key to generate signed hash data. For example, authentication engine 55 may sign the hash data using a private key of an asymmetric key pair (e.g., a private key corresponding to a public key that can only be used to decrypt data encrypted using that private key). By signing the hash data, programmable device 10 may verify that the configuration data was generated by the right (authorized) logic designer. If desired, engine 55 may digitally sign the hash data by only encrypting a portion of the hash data such as a leading hash value of the hash data using the private key. In one scenario, a keyed cryptographic hash function such as HMAC may be used to create the signed hash data. In another scenario, a non-keyed cryptographic hash function may be used to create the hash data (at step 62) and the resulting hash tag may be signed using a privately-keyed cryptographic function (for example).

At step 66, logic design system 56 may provide the signed hash data to programmable logic device 10 via loading equipment 54 and configuration device 40. Programmable logic device 10 may verify the digital signature of the signed hash data received from configuration device 40 to determine the authenticity of the corresponding configuration data bit stream received from design system 56. If the signed data is successfully verified (e.g., the received bit stream represented by the signed hash data is deemed to be authentic), the configuration data bit stream of the signed hash data may be used to configure device 10. If the signed data is not successfully verified (e.g., the received bit stream represented by the signed hash data is deemed to be inauthentic), the configuration data bit stream represented by the signed hash data may be discarded. In this way, a user of device 10 may ensure that the correct and authorized bit stream is used to configure device 10.

Figure 4:
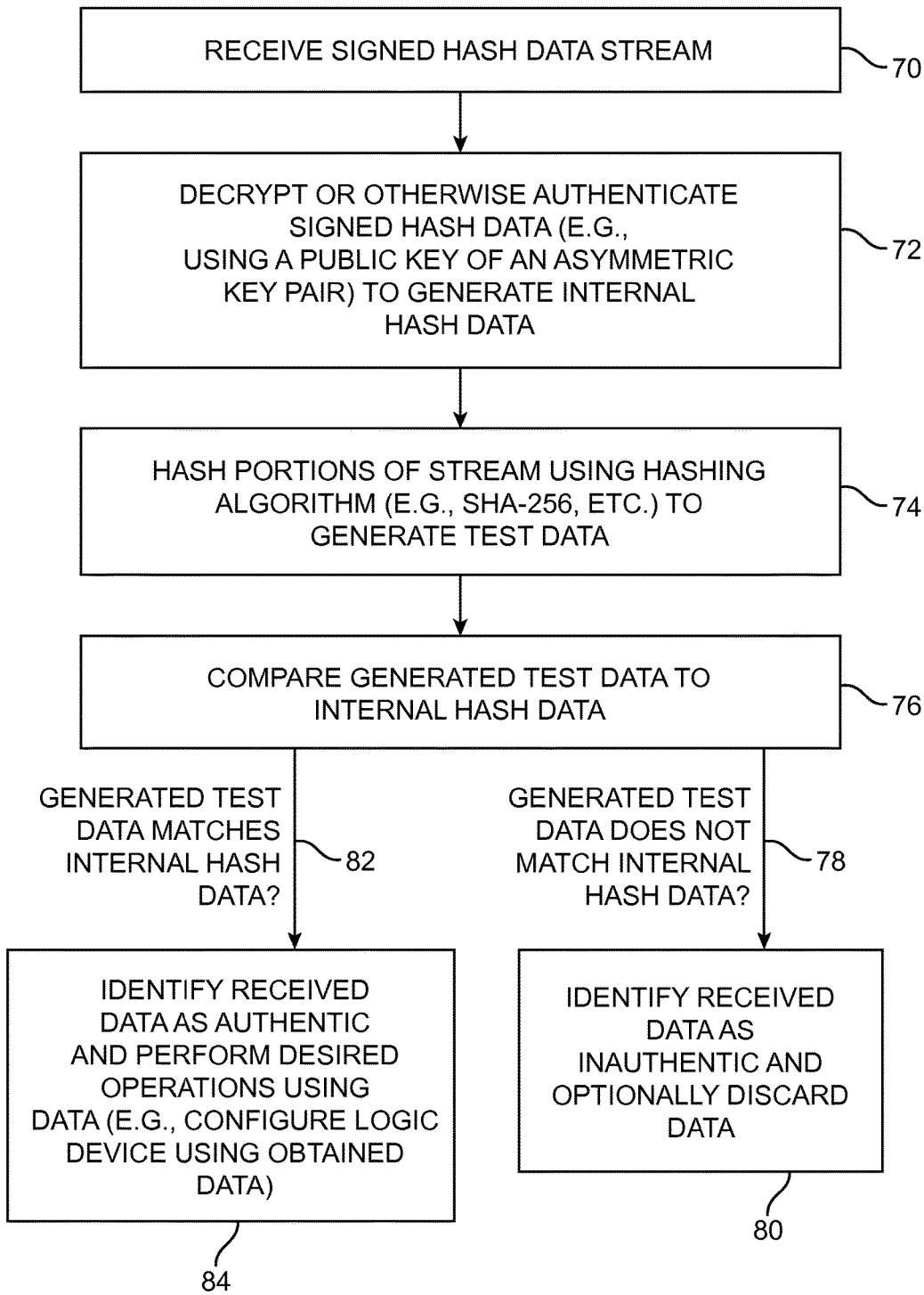
FIG. 4 is a flow chart of illustrative steps that may be performed by a programmable device of the type shown in FIG. 2 for receiving a signed hash data stream and for verifying the authenticity of the signed hash data stream prior to loading configuration data identified by the signed hash data stream in accordance with an embodiment of the present invention.

FIG. 4 is a flow chart of illustrative steps that may be performed by programmable logic device 10 for verifying the authenticity of received data (e.g., for verifying the authenticity of configuration data bit streams received from configuration device 40).

At step 70, device 10 may receive signed hash data (e.g., the signed and hashed configuration data bit stream generated by logic design system 56 at steps 60-64 of FIG. 3) from a configuration device such as configuration device 40 of FIG. 2. Device 10 may receive the bits of the signed hash data in sequential order from a first bit of the signed hash data stream to a last bit of the signed hash data stream over time.

At step 72, device 10 may authenticate the signed hash data using a cryptographic authentication algorithm to generate internal hash data. For example, device 10 (e.g., a cryptographic engine on device 10) may decrypt or otherwise authenticate the signed hash data using a public key of an asymmetric key pair (e.g., a public key corresponding to the private key used by logic design system 56 to sign the hash data while processing step 64 of FIG. 3) to generate the internal hash data. Device 10 may, for example, decrypt or otherwise authenticate the signed hash data by decrypting the portion (e.g., leading hash value) of the signed hash data stream that was encrypted with the private key using the public key corresponding to the private key.

At step 74, device 10 may hash portions of the received hash data stream to generate test hash data (sometimes referred to herein as test data, test hash tags, or test hash values). For example, device 10 may hash portions of the original bit stream (e.g., plaintext or ciphertext versions of the original bit stream) and one or more of the hash values interspersed throughout the bit stream to generate the test hash data. Any desired hash function may be used to hash the hash data stream portions (e.g., the hash function may be reproducible and irreversible). In general, the same hash function may be used at device 10 as was used by the authentic (expected) logic design system 56 to hash the bit stream (e.g., at step 62 of FIG. 3). For example, device 10 may perform a SHA-256 algorithm on portions of the obtained data to generate the hashed data.

If desired, device 10 may hash the hash data stream using a hash function that takes as its input one or more portions of the hash data stream (e.g., interspersed hash values and/or portions of the original bit stream). If desired, device 10 may perform multiple hashing operations on different portions of the bit stream to generate multiple different test hash values (e.g., hashing operations taking as an input different respective portions of the original bit stream and/or hash values from the hash data stream).

At step 76, device 10 may compare the test hash data (e.g., as generated while processing step 74) to the internal hash data that was generated by decrypting or otherwise authenticating the received signed hash data (e.g., as generated while processing step 72). If desired, device 10 may compare different generated test hash values to corresponding hash values in the internal hash data (e.g., as the signed hash data is continuously received).

If the generated test hash data does not match the internal hash data, processing may proceed to step 80 as shown by path 78. At step 80, device 10 may identify the configuration bit stream associated with the internal hash data as inauthentic, because the hash of the received bit stream performed at device 10 using the corresponding cryptographic key is not the same as the bit stream generated and signed by the authentic logic design system 56 (e.g., the received bit stream may have been tampered with, manipulated, or replaced by an inauthentic bit stream). If desired, device 10 may discard the (inauthentic) hash data bit stream and/or may alert a user that the bit stream is inauthentic.

If the generated test hash data matches the internal hash data (e.g., if each test hash value matches each hash value in the hash data), processing may proceed to step 84 as shown by path 82. At step 84, device 10 may identify the received configuration data bit stream associated with the hash data (e.g., the original bit stream interspersed among the hash values of the hash data) as authentic because the hash of the received bit stream is the same as the hash data (e.g., the received configuration data bit stream may be identified as being generated by authentic logic design equipment 56). Device 10 may perform any desired operations using the authenticated data. For example, device 10 may configure programmable logic on device 10 using the authenticated configuration data bit stream (e.g., the original bit stream portions of the hash data stream that is interspersed among the hash values in the hash data stream).

This example in which the internal hash data is compared to the hash data is merely illustrative. If desired, the test hash data and the internal hash data may be provided as inputs to any desired cryptographic authentication algorithm (e.g., in a Digital Signature Algorithm (DSA) signing scheme) that outputs a "pass" signal if the bit stream corresponding to the internal hash data is authentic and a "fail" signal if the bit stream is inauthentic (e.g., processing may proceed to step 84 in response to generating the "pass" signal whereas processing may proceed to step 80 in response to the "fail" signal). If desired, an expected hash tag may be included as a part of the bit stream along with the signature and can be pre-authenticated against the signature using a cryptographic authentication algorithm (e.g., in which case the internal hash tag may be directly compared to the pre-authenticated hash tag).

Figure 5:
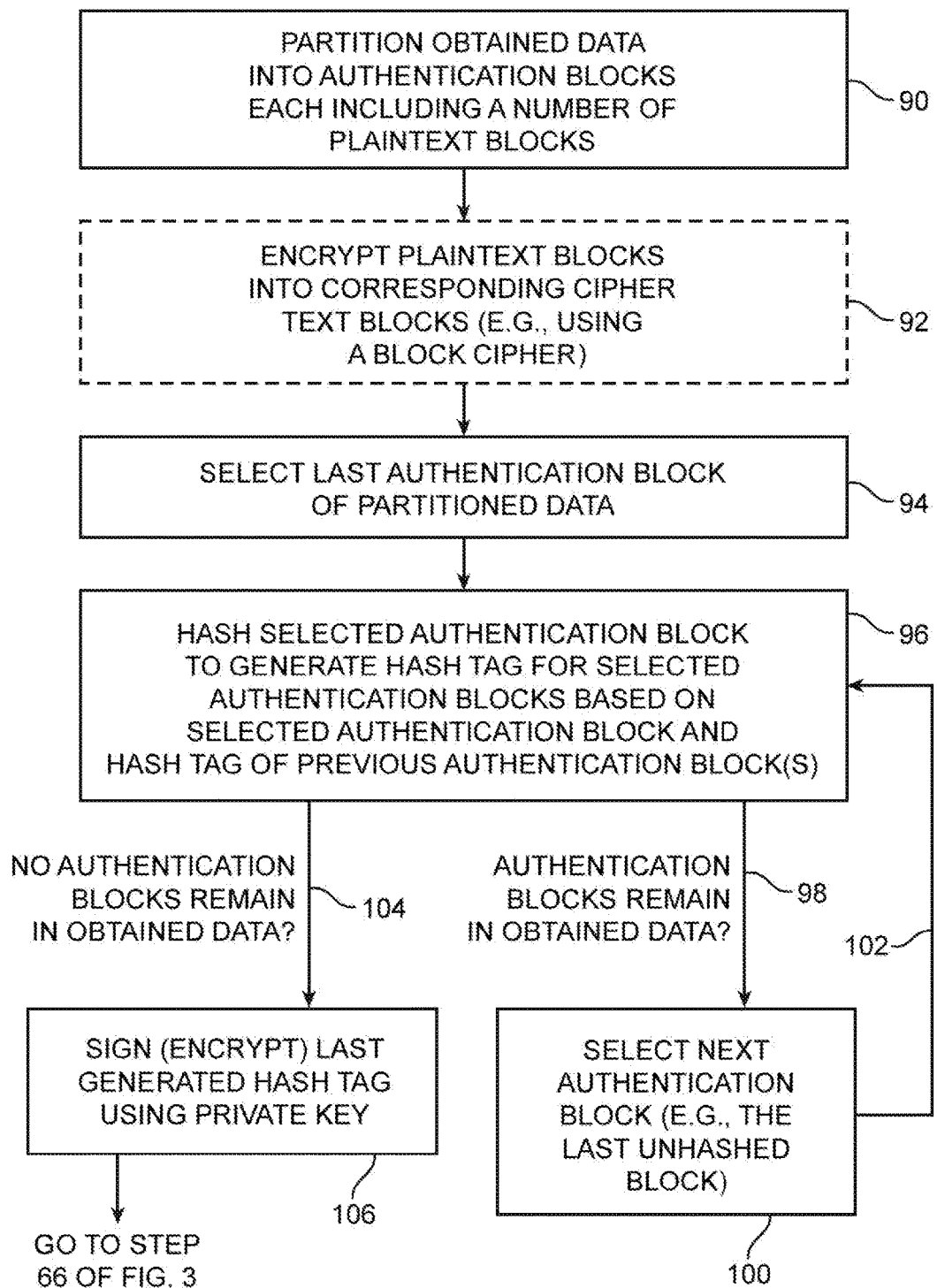
FIG. 5 is a flow chart of illustrative steps that may be performed by an authentication engine to partition a configuration data bit stream into authentication blocks and for generating a signed hash data stream by hashing the authentication blocks in a reverse order from the trailing authentication block to the leading authentication block of the bit stream in accordance with an embodiment of the present invention.

FIG. 5 is a flow chart of illustrative steps that may be performed by logic design system 56 (e.g., authentication engine 55 on system 56) to generate the signed hash data provided to device 10. In the example of FIG. 5, the hashing of the obtained configuration data bit stream is computed by engine 55 in a reverse order (e.g., in an order opposite to the order in which the bit stream is provided to device 10 for configuring device 10). The steps of FIG. 5 may, for example, be performed while processing steps 62 and 64 of FIG. 3 (e.g., after a configuration data bit stream for use in configuring programmable logic devices has been specified by a logic designer and obtained by authentication engine 55).

At step 90, authentication engine 55 may partition the obtained configuration data bit stream into a number of authentication blocks. For example, engine 55 may partition the bit stream into a predetermined number of equally-sized authentication blocks. If desired, the last authentication block of the bit stream may be padded with predetermined bits so that each of the authentication blocks has the same size. Each authentication block may include a number of corresponding plaintext blocks of the configuration data bit stream. For example, each authentication block may include the same number of plaintext blocks and each plaintext block may have the same size (e.g., engine 55 may partition the bit stream into authentication blocks having the same number of 128-bit plaintext blocks). This example is merely illustrative. In general, each authentication block may have any desired number of plaintext blocks of any desired size (e.g., different sizes or similar sizes).

At optional step 92, authentication engine 55 may encrypt the plaintext blocks of the partitioned bit stream to generate corresponding ciphertext blocks. For example, engine 55 may use a key stream of a block cipher to generate a ciphertext block for each plaintext block of the partitioned bit stream (e.g., to provide additional security to the bit stream). Each authentication block may thereby include the same number of ciphertext blocks of a predetermined size. If desired, step 92 may be omitted and each authentication block may include only plaintext blocks.

At step 94, authentication engine 55 may select the last authentication block of the partitioned bit stream for processing (e.g., the last bits of the obtained bit stream, which fall within the last authentication block of the partitioned bit stream). The last authentication block may be defined herein as the last authentication block of the bit stream that is provided to programmable device 10 (e.g., the last authentication block received by device 10 in real time as the bit stream is received and the last authentication block to be used by device 10 to configure custom logic designs on device 10). Similarly, a first authentication block may be defined herein as the first authentication block of the bit stream that is received by device 10 and the first authentication block that is used by device 10 to configure the programmable logic on device 10.

At step 96, engine 55 may perform a hashing operation using a hashing function that takes as its input the one or more of the selected authentication block, the previously selected authentication block(s) (e.g., authentication blocks nearer to the last authentication block of the bit stream than the selected authentication block), and the hash tags (sometimes referred to herein as a hash value, authentication tag, or authentication value) of the previously selected authentication block(s) to generate a hash tag for the selected authentication block. For example, the generated hash tag may be the output of a hashing function that takes as an input the selected authentication block and the hash tag of the previously selected authentication block in the partitioned bit stream (if available). Engine 55 may append (e.g., concatenate) the generated hash tag to the selected authentication block in the bit stream such that the hash tag is interspersed among the authentication blocks of the bit stream.

When the last authentication block of the bit stream is selected, engine 55 may generate a hash tag for the last authentication block of the bit stream by hashing the last authentication block and an optional final hash field that includes private hash key data. As an example, engine 55 may generate the hash tags using a SHA-256 hashing function. This example is merely illustrative and, if desired, engine 55 may generate each hash tag by hashing any desired previous authentication block and/or previously generated hash tags and any desired hashing function may be used (e.g., an HMAC keyed hashing function, etc.).

If authentication blocks remain in the bit stream for processing, processing may proceed to step 100 as shown by path 98. At step 100, engine 55 may select the next authentication block of the bit stream. The next authentication block of the bit stream may be the last authentication block of the bit stream that does not have a corresponding hash value (e.g., the last unhashed block of the partitioned bit stream). For example, when the last authentication block is selected, the next selected authentication block may be the next-to-last authentication block (e.g., the last authentication block that has yet to be hashed). Processing may subsequently loop back to step 96 as shown by path 102 to compute hash tags for the remaining authentication blocks of the partitioned bit stream.

By selecting the last authentication block first (e.g., at step 94) and continuing to select the next-to-last authentication block for hashing, engine 55 may generate hash values for the bit stream in a reverse order from the end of the stream to the beginning of the stream with respect to the order in which the bit stream is received at programmable device 10 (e.g., each hash value for the bit stream may be computed based on authentication blocks and already-computed hash values that are received by device 10 after device 10 receives that hash value). By appending hash tags after each authentication block, the final hashed data bit stream may include a number of authentication blocks with interspersed hash tags. A first hash tag may be appended to the front of the hashed bit stream (e.g., the first bit of the bit stream received by programmable device 10).

If no authentication blocks remain in the partitioned bit stream, processing may proceed to step 106 as shown by path 104. At step 106, engine 55 may sign (encrypt) the last-generated hash tag (e.g., the first hash tag of the hashed data stream to be received by device 10) using a private key of an asymmetric key pair. Processing may subsequently proceed to step 66 of FIG. 3 to provide the hashed data stream to configuration device 40 and device 10.

Figure 6:
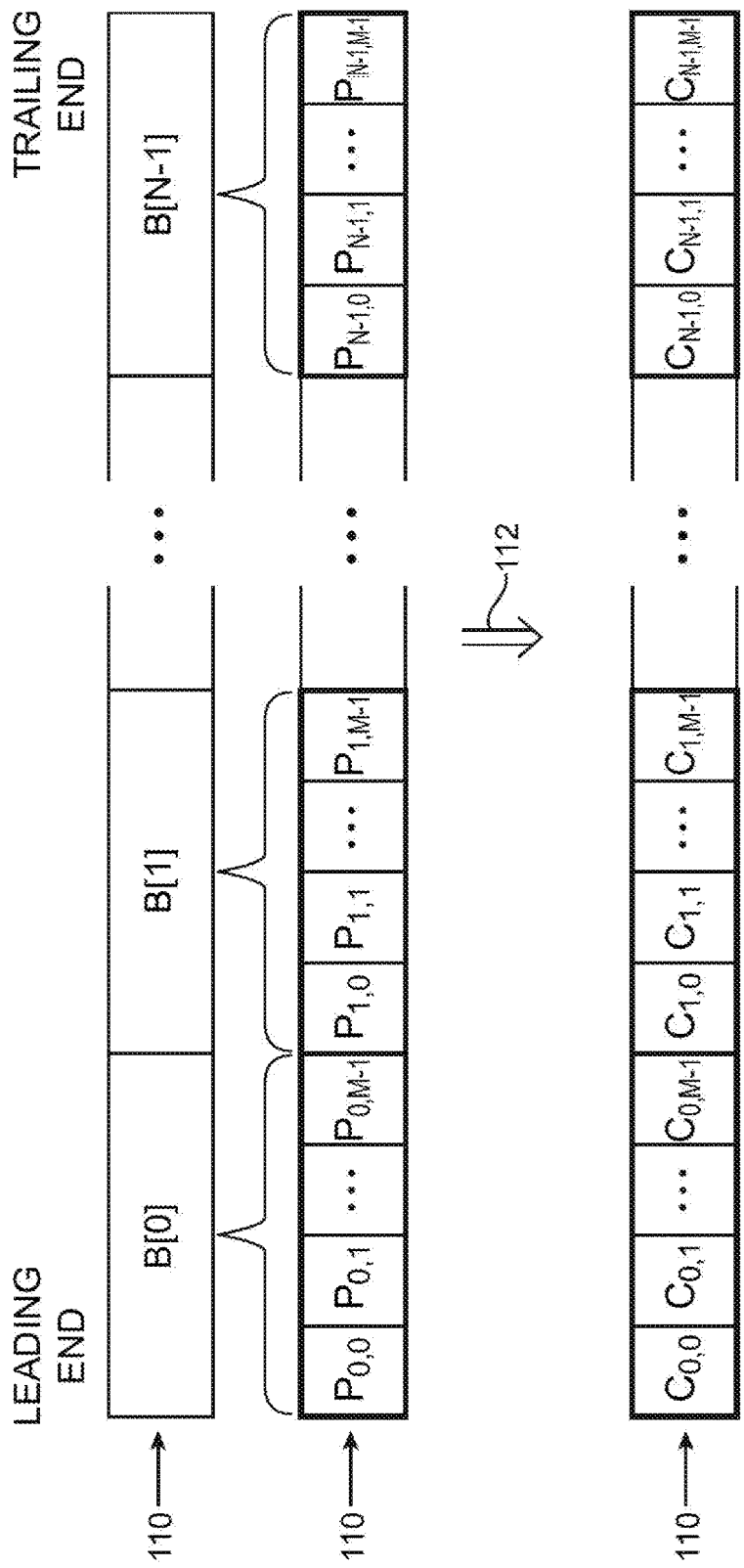
FIG. 6 is a diagram showing how an illustrative authentication engine may partition a configuration data bit stream into authentication blocks and may optionally encrypt plaintext blocks within the authentication blocks to generate corresponding ciphertext blocks in accordance with an embodiment of the present invention.

FIG. 6 is an illustrative diagram showing how authentication engine 55 may partition an obtained configuration data bit stream into corresponding authentication blocks. As shown in FIG. 6, configuration data bit stream 110 may be obtained by authentication engine 55 (e.g., while processing step 60 of FIG. 3). Bit stream 110 may, for example, be specified by a logic designer and may be used to implement a number of desired logic functions. Bit stream 110 may have any desired length (e.g., hundreds of bits, thousands of bits, tens of thousands of bits, hundreds of thousands of bits, etc.). Bit stream 110 may have a leading end (e.g., at the left side as shown in FIG. 3) followed by a trailing end (e.g., at the right side). Engine 55 may receive stream 110 from the leading end to the trailing end and may provide stream 110 to device 10 from the leading end to the trailing end. Engine 55 may partition bit stream 110 into a number N of authentication blocks B[i], where i is an integer index from 0 to N−1 that identifies each authentication block in bit stream 110 (e.g., a first authentication block B[0], a second authentication block B[1], an Nth authentication block B[N−1]).

Each authentication block B[i] may include a number M of equally sized plaintext blocks $P_{i,j}$, where j is an integer index from 0 to M−1 that identifies each plaintext block within a given authentication block (e.g., authentication block B[0] may include a first plaintext block $P_{0,0}$, a second plaintext block $P_{0,1}$, an $M^{th}$ plaintext block $P_{0,M-1}$, authentication block B[N−1] may include a first plaintext block $P_{N-1,0}$, a second plaintext block $P_{N-1,1}$, an Mth plaintext block $P_{N-1,M-1}$, etc.). As an example, each plaintext block $P_{i,j}$ may include 128 bits of bit stream 110. In general, plaintext blocks $P_{i,j}$ may include any desired number of bits.

If desired, authentication engine 55 may encrypt plaintext blocks $P_{i,j}$ to generate corresponding ciphertext blocks $C_{i,j}$ as shown by arrow 112 (e.g., while processing step 92 of FIG. 5). As shown in FIG. 6, plaintext block $P_{0,0}$ of authentication block B[0] in bit stream 110 may be encrypted to generate ciphertext block $C_{0,0}$ of authentication block B[0] in bit stream 110, plaintext block $P_{1,1}$ may be encrypted to generate ciphertext block $C_{1,1}$ of authentication block B[1], plaintext block $P_{N-1,M-1}$ may be encrypted to generate ciphertext block $C_{N-1,M-1}$, etc. Each ciphertext $C_{i,j}$ block may, for example, have the same size as the corresponding plaintext block $P_{i,j}$ (e.g., 128 bits) or may have a different size than the corresponding plaintext block.

Figure 7:
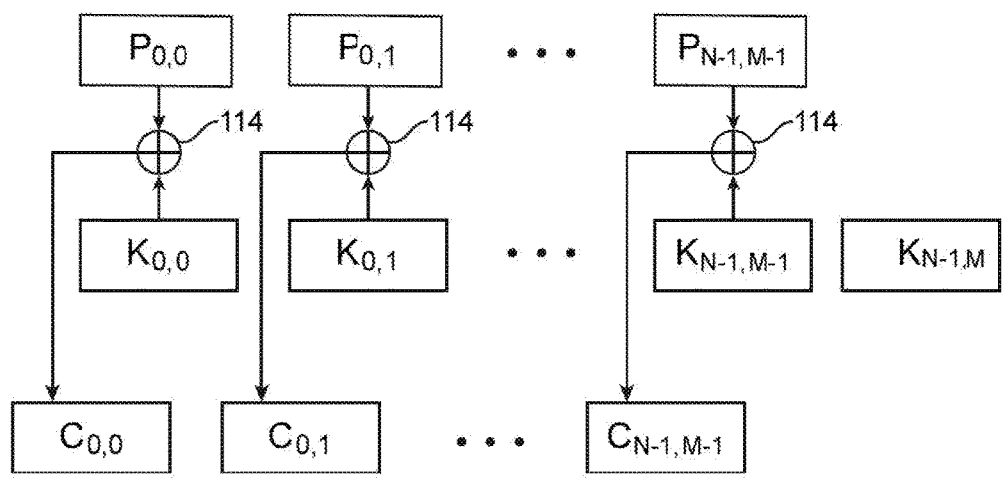
FIG. 7 is a diagram showing how an illustrative authentication engine may encrypt plaintext blocks of a configuration data bit stream to generate corresponding ciphertext blocks using key stream blocks from a cryptographic key stream in accordance with an embodiment of the present invention.

If desired, authentication engine 55 may generate ciphertext blocks $C_{i,j}$ using key stream blocks of a key stream associated with a cryptographic block cipher. FIG. 7 is an illustrative diagram that shows how engine 55 may generate ciphertext blocks $C_{i,j}$ using corresponding plaintext blocks $P_{i,j}$ and key stream blocks of a cryptographic block cipher. As shown in FIG. 7, engine 55 may generate a key stream of key stream blocks $K_{i,j}$ each corresponding to a respective plaintext block $P_{i,j}$ (e.g., a first key stream block $K_{0,0}$ corresponding to plaintext block $P_{0,0}$, a second key stream block $K_{0,1}$ corresponding to plaintext block $P_{0,1}$, etc.). Each key stream block $K_{i,j}$ may be generated as the output of a block cipher (e.g., an AES cipher) that encrypts and increments a corresponding counter value. Key stream blocks $K_{i,j}$ may be generated by authentication engine 55 or by other cryptographic equipment on logic design system 56 or external to logic design system 56.

Authentication engine 55 may include exclusive-OR (XOR) logic 114 (e.g., logic elements or gates implemented in software and/or hardware running on system 56). XOR elements 114 may each receive a corresponding plaintext block $P_{i,j}$ and key stream block $K_{i,j}$ at its inputs and may output a corresponding ciphertext block $C_{i,j}$. For example, a first XOR element 114 may perform an XOR logic operation on plaintext block $P_{0,0}$ and key stream block $K_{0,0}$ to produce ciphertext block $C_{0,0}$, a second XOR element 114 may perform an XOR logic operation on plaintext block $P_{0,1}$ and key stream block $K_{0,1}$ to produce ciphertext block $C_{0,1}$, etc. Each authentication block B[0] may include corresponding plaintext blocks $P_{i,j}$ or, in scenarios where plaintext blocks $P_{i,j}$ are encrypted, may include corresponding ciphertext blocks $C_{i,j}$.

Bit stream 110 may include a series (stream) of data bits. The ordering (sequence) of the bits in bit stream 110 may determine the custom logic functions that are implemented on programmable logic device 10 when logic device 10 uses the bit stream to configure its logic circuitry. When bit stream 110 is used to configure programmable logic devices such as device 10 of FIG. 2, device 10 may receive bit stream 110 in an order from left to right as shown in FIG. 7 (e.g., bit stream 110 may flow from right to left such that first authentication block B[0] is received first and last authentication block B[N−1] is received last at the receiving device). For example, the first (left-most) bit of authentication block B[0] may be the first bit of bit stream 110 received at device 10 and the first bit used to configure device 10 over time, whereas the last (right-most) bit of authentication block B[N−1] may be the last bit of bit stream 10 received at device 10 and the last bit used to configure device 10 over time.

Figure 8:
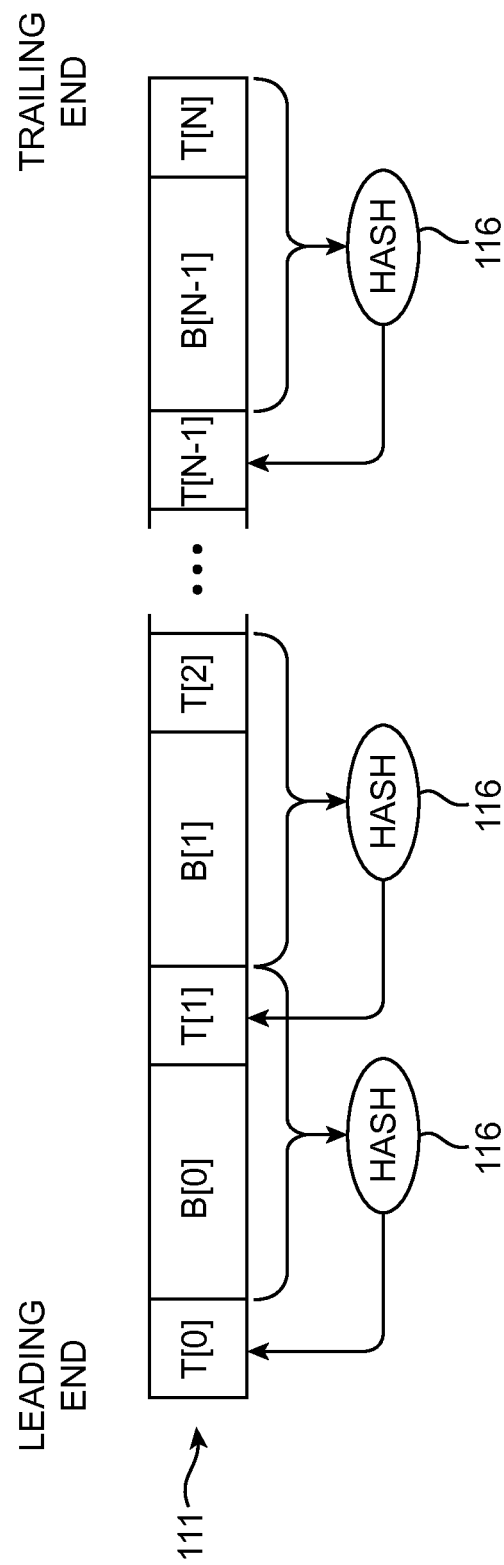
FIG. 8 is a diagram showing how an illustrative authentication engine may generate a hash (hashed) data stream by hashing portions of a configuration data bit stream in a reverse order from the end of the bit stream to the beginning of the bit stream in accordance with an embodiment of the present invention.

Authentication engine 55 may select authentication blocks B[i] in bit stream 110 for hashing in a reverse order with respect to the order in which the bits are to be received at logic device 10 (e.g., with respect to the order in which the bits are used to configure device 10). FIG. 8 is an illustrative diagram showing how engine 55 may generate hash tags for each authentication block in the partitioned bit stream in reverse order (e.g., while processing steps 94-104 of FIG. 5) to generate a hashed data stream.

As shown in the example of FIG. 8, engine 55 may generate hash tags T[i] for each corresponding authentication block B[i] (e.g., authentication blocks having corresponding plaintext blocks $P_i$ or ciphertext blocks $C_{i,j}$) in bit stream 110 as a function of the later (e.g., previously selected and hashed) authentication blocks B[k] and hash tags T[k] of the bit stream, where k is an integer index greater than or equal to index i (e.g., as a function of hash tags and authentication blocks to the right of the hash tag that is being computed as shown in FIG. 8). In this way, hashing for each authentication block B[i] is computed in a reverse order with respect to the order with which bit stream 110 is to be received at device 10.

As shown in FIG. 8, engine 55 may generate hash data stream 111 corresponding to bit stream 110 once respective hash tags have been computed and appended for each authentication block B[i]. In the example of FIG. 8, each hash tag T[i] is computed as a function of the previously-computed authentication block B[i+1] and hash tag T[i+1]. If desired, an optional tag T[N] may be appended to the end of bit stream 110 (e.g., to the right-most (last) bit of stream 110) prior to hashing. Optional tag T[N] may include private hash key data such as data from a key stream block used to generate ciphertext in authentication blocks B[i].

To generate hash data stream 111, engine 55 may generate hash tags T[i] for authentication blocks B[i] in a reverse order from the end of the stream to the beginning of the stream with respect to the order that the stream is provided to device 10. A first hashing operation 116 (e.g., an HMAC function, SHA function, or any other desired hashing function) may receive as its inputs the bits of Nth authentication block B[N−1] (e.g., the right-most and last authentication block to be used to configure device 10) and optional tag T[N] and may produce corresponding hash tag T[N−1] at its output (e.g., hash tag T[N−1] may be a hash of authentication block B[N−1] and tag T[N]). Hash tag T[N−1] may be appended to the first (left-most) bit of authentication block B[N−1] in hash data stream 111. Hash tag T[N−1] and authentication block B[N−1] may be provided as inputs for generating a hash tag for the next selected authentication block in bit stream 110 (e.g., block B[N−2]). Engine 55 may compute hash tag T[1] for authentication block B[1] by providing the bits of authentication block B[1] and previous hash tag T[2] to hashing function 116. Hashing function 116 may produce hash tag T[1] and engine 55 may append tag T[1] to the front of authentication block B[1] in signed hash data 111. Similarly, hashing function 116 may generate first (leading) hash tag T[0] by hashing authentication block B[0] and hash tag T[1]. As each hash tag T[i] depends on the previous authentication block B[i+1] and hash tag T[i+1], first hash tag T[0] may depend on each bit across bit stream 110 and may be unique to that bit stream.

Authentication engine 55 may digitally sign hash data stream 111 by encrypting or otherwise signing first hash tag T[0] (e.g., using a private key of a corresponding asymmetric key pair). As first hash tag T[0] depends on each of the other (previously-generated) hash tags in stream 111, engine 55 need only sign (encrypt) the first tag T[0] of stream 111 to ensure security of the stream. In this way, time and resource-intensive encryption of the entire bit stream may be omitted. If desired, first hash tag T[0] may be further encrypted or obfuscated (e.g., using additional cryptographic keys). In another suitable arrangement, additional hash tags T[i] in stream 111 may be encrypted using one or more cryptographic keys (e.g., tag T[1] may be encrypted, tag T[2] may be encrypted, etc.).

Once leading hash value T[0] is signed, the signed hash data stream 111 may be provided to programmable logic device 10 (e.g., while processing step 66 of FIG. 3) in an order from left to right as shown in FIG. 8. Device 10 may receive and decrypt or otherwise authenticate leading hash tag T[0] of the signed hash data stream 111 (e.g., using any desired cryptographic authentication algorithm, a public key corresponding to the private key used to encrypt hash tag T[0] while processing step 72 of FIG. 4, etc.). Once device 10 receives the bits of authentication block B[0] and hash tag T[1] from the incoming stream, device 10 may generate a test data hash tag T'[0] by computing hashing operation 116 as a function of the bits of authentication block B[0] and hash tag T[1].

Device 10 may compare the generated test data hash tag T'[0] to hash tag T[0] received in hash data bit stream 111 (e.g., while processing step 76 of FIG. 4) to determine whether leading authentication block B[0] is authentic. This is merely illustrative. In general, test data tag T'[0] and T[0] may be provided as inputs to any desired cryptographic authentication algorithm that outputs a "pass" signal if the test hash tag is authentic and that outputs a "fail" signal if the test hash tag is inauthentic. If leading authentication block B[0] is inauthentic (e.g., if test hash T'[0] does not match hash T[0]), the entire data stream 111 may be identified as inauthentic and may be discarded or ignored. If authentication block B[0] is authentic (e.g., if test hash T'[0] matches hash T[0], device 10 may configure its programmable logic using authentication block B[0] and may subsequently use hash tag T[1] to authenticate the bits of authentication block B[1] (e.g., by generating test hash value T'[1] by hashing B[1] and T[2] and comparing test hash value T'[1] to hash value T[1] or otherwise inputting values T'[1] and T[1] to a cryptographic authentication algorithm). This process may proceed until each authentication block B[i] in stream 111 has been authenticated.

Figure 9:
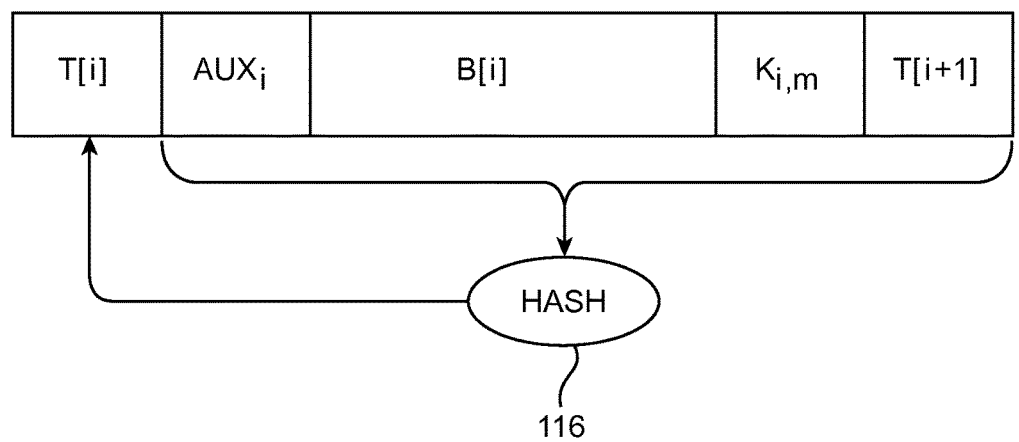
FIG. 9 is an illustrative diagram showing how an authentication block in a configuration data bit stream may include auxiliary information and key information that serve as inputs to a hashing function for hashing a configuration data bit stream in reverse order in accordance with an embodiment of the present invention.

If desired, each authentication block B[i] may include auxiliary information that is not used to configure programmable device 10 such as address information or key stream data. FIG. 9 is an illustrative diagram showing how an $i^{th}$ authentication block B[i] may include optional auxiliary information $AUX_i$ and key information $K_{i,m}$ (e.g., information associated with a cryptographic key used to generate ciphertext within authentication block B[i]). In the example of FIG. 9, information $K_{i,m}$ is appended to the end of block B[i] whereas information $AUX_i$ is appended to the beginning of block B[i]. The example of FIG. 9 is merely illustrative. If desired, information $K_{i,m}$ and $AUX_i$ may both be appended to the beginning or end of authentication block B[i], information $K_{i,m}$ may be appended to the beginning of block B[i] whereas information $AUX_i$ may be appended to the end of block B[i], or information $AUX_i$ and $K_{i,m}$ may be interspersed throughout authentication block B[i]. Auxiliary information $AUX_i$ and/or key data $K_{i,m}$ may serve as additional inputs to hash function 116 when computing hash tag T[i] for block B[i] (e.g., hash function 116 may perform a hashing operation on data $AUX_i$, $K_{i,m}$, B[i], and T[i+1] when generating tag T[i]).

The example in which each hash tag T[i] is computed based on the immediately adjacent authentication block B[i] and hash tag T[i+1] is merely illustrative. If desired, a given hash tag T[i] may be computed using any desired hashing operation as a function of later hash tags and authentication blocks in hash data stream 111 (e.g., as a function of any number and combination of hash tags T[k] and authentication blocks B[k] in stream 111, where k is greater than or equal to i). In one suitable arrangement, some tags T[i] may be computed by hashing only authentication blocks B[i] whereas other tags T[i] are computed by hashing only other tags T[i] in stream 111.

Figure 10:
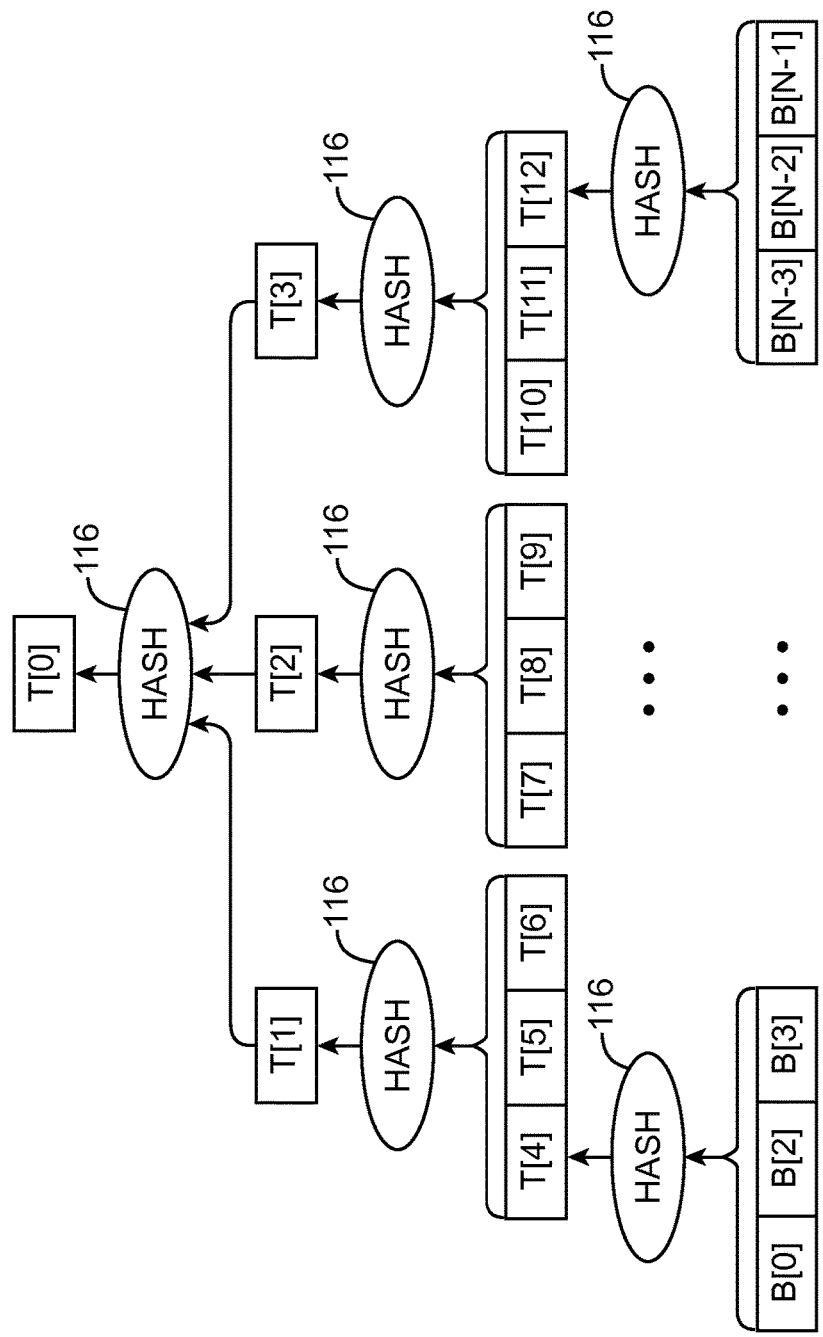
FIG. 10 is an illustrative diagram showing how a leading hash value for a hash data stream may be computed based on bits from later authentication blocks and hash values in the hash data stream (e.g., while hashing the corresponding configuration data bit stream in reverse order) in accordance with an embodiment of the present invention.

FIG. 10 is an illustrative diagram showing one possible arrangement for generating hash tags in signed bit stream 111 in which some tags T[i] are computed by hashing only authentication blocks B[i], whereas other tags T[i] are computed by hashing only other tags T[i] in stream 111. As shown in the example of FIG. 10, hash tags T[4-12] are generated by hashing authentication blocks B[i] (e.g., hash tag T[4] is computed by hashing blocks B[0], B[2], and B[3], hash tag T[12] is computed by hashing blocks B[N−3], B[N−2], and B[N−1], etc.) whereas hash tags T[1-3] are generated by hashing hash tags T[4-12] (e.g., hash tag T[1] is computed by hashing tags T[4-6], hash tag T[2] is computed by hashing tags T[7-9], hash tag T[3] is computed by hashing tags T[10-12], and hash tag T[0] is computed by hashing tags T[1-3]).

Figure 11:
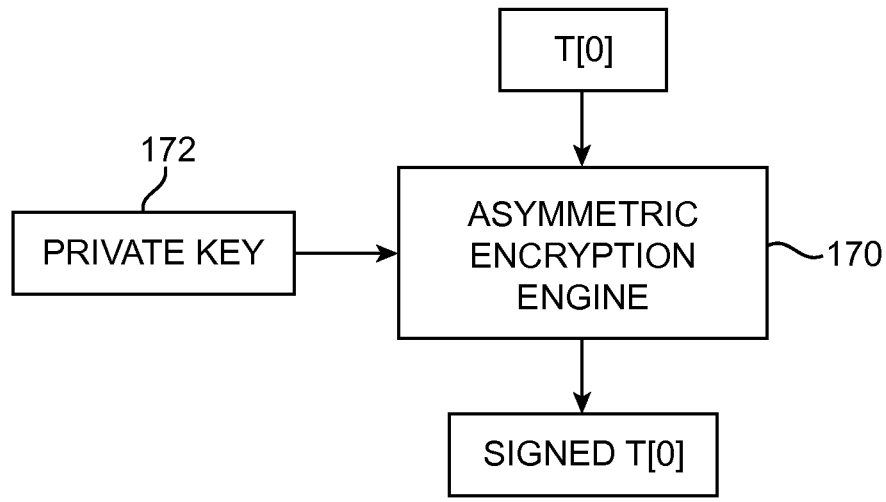
FIG. 11 is a diagram showing how an illustrative authentication engine may include encryption circuitry for encrypting a leading hash value of a generated hash data stream of the type shown in FIG. 8 using a private key of an asymmetric key pair in accordance with an embodiment of the present invention.

FIG. 11 is an illustrative diagram showing how authentication engine 55 may sign leading hash tag T[0] in hash data stream 111 (FIG. 8) to generate the signed hash data stream 111 (e.g., while processing step 106 of FIG. 4 or step 64 of FIG. 3). As shown in FIG. 11, authentication engine 55 may include asymmetric encryption engine 170 that receives private key 172 (e.g., a private key of an asymmetric key pair) and leading hash tag T[0]. Asymmetric encryption engine 170 may sign (encrypt) first hash tag T[0] using private key 172 to generate signed hash tag T[0]. The signed hash data stream 111 may then be passed to device 10 for authentication and logic configuration.

Figure 12:
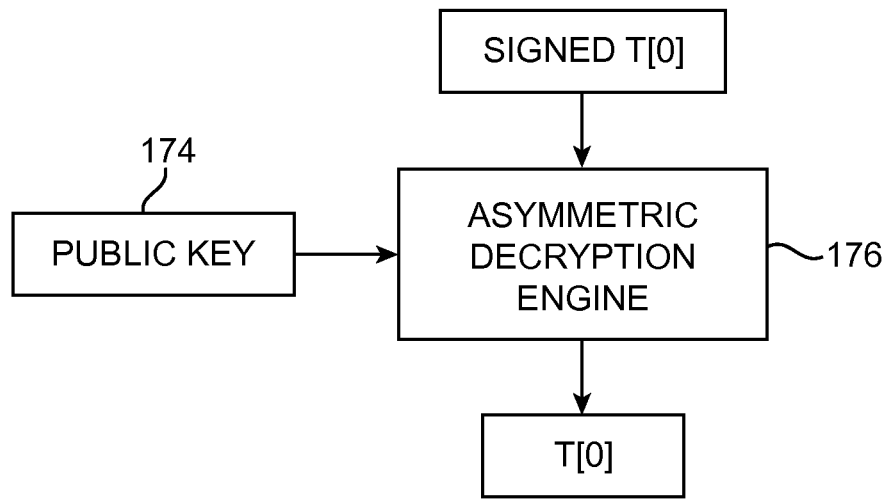
FIG. 12 is a diagram showing how an illustrative programmable logic device may include decryption circuitry for decrypting or otherwise authenticating a leading hash value of a hash data stream of the type shown in FIG. 8 using a public key of an asymmetric key pair in accordance with an embodiment of the present invention.

FIG. 12 is an illustrative diagram showing how programmable logic device 10 may decrypt or otherwise authenticate the signed hash data stream 110 (e.g., while processing step 72 of FIG. 4). As shown in FIG. 12, device 10 may include asymmetric decryption engine 176 that receives public key 174 (e.g., the public key corresponding to private key 172 in the asymmetric key pair) and signed hash tag T[0] (e.g., from signed hash data stream 111). Engine 176 may decrypt signed hash tag T[0] using public key 174 to retrieve hash tag T[0] from signed hash data stream 111. Hash tag T[0] retrieved by engine 176 may be the internal hash data described above in connection with step 72 of FIG. 4 and may be compared to test data generated at device 10 (e.g., test data T'[0] computed based on a hash function of one or more of the later authentication blocks B[k] and hash tags T[k] of stream 111, where k is greater than or equal to 0) to authenticate the received bit stream 111 (e.g., to authenticate the bit stream 110 identified by hash data stream 111).

Figure 13:
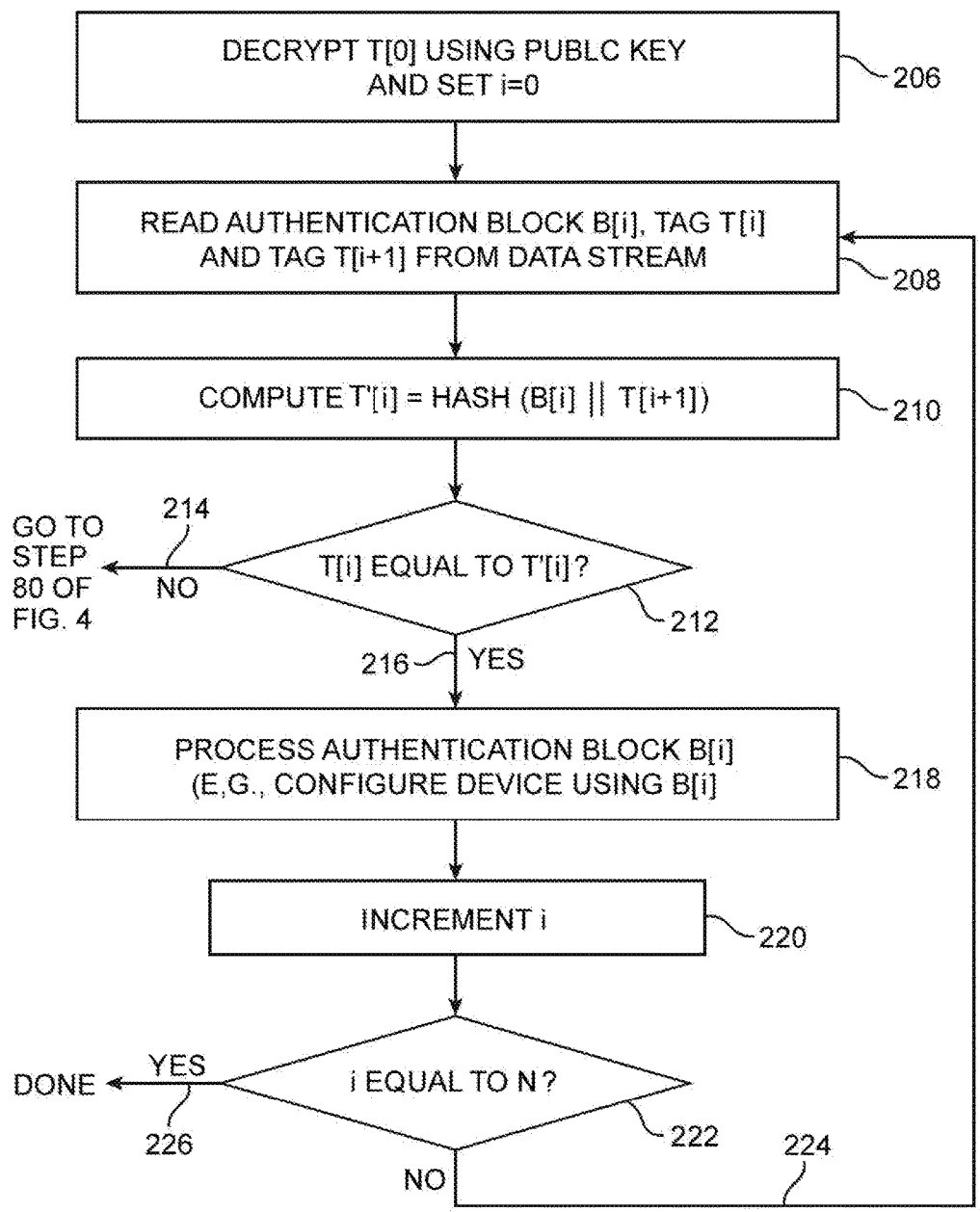
FIG. 13 is a flow chart of illustrative steps showing how a programmable logic device may authenticate a received hash data stream on a per-authentication block basis prior to loading configuration data identified by the hash data stream in accordance with an embodiment of the present invention.

FIG. 13 is a flow chart of illustrative steps that may be performed by logic device 10 for authenticating the received signed hash data stream 111. The steps of FIG. 13 may, for example, be performed by device 10 for received signed hash stream 111 as shown by FIG. 8 while processing step 72-84 of FIG. 4. The steps of FIG. 13 may be performed while device 10 receives data stream 111 in a left to right direction as shown in FIG. 8 (e.g., device 10 may receive first hash tag T[0], may then receive authentication block B[0], and may subsequently receive the remainder of stream 111).

At step 206, device 10 may decrypt or otherwise authenticate first hash tag T[0] of signed hash data stream 111 (e.g., a first hash tag of internal hash data as described above). For example, decryption engine 176 may decrypt first hash tag T[0] using public key 174 (FIG. 12). Device 10 may initialize index i to 0.

At step 208, device 10 may receive and read hash tag T[i], authentication block B[i], and subsequent hash tag T[i+1] (e.g., tag T[0], block B[0], and tag T[1]) from hash data stream 111 as stream 111 is received).

At step 210, device 10 may generate test hash tag T'[i] by hashing read authentication block B[i] and read hash tag T[i+1] using hashing function 116 (e.g., by providing block B[i] and tag T[i+1] as inputs to hash function 116). For example, device 10 may generate a leading (first) test hash tag T'[0] by hashing block B[0] and tag T[1].

At step 212, device 10 may compare test hash tag T'[i] with the read internal hash tag T[i] from hash data stream 111. For example, device 10 may compare test hash tag T'[0] (as computed at step 210) to the internal hash tag T[0] (e.g., as decrypted during step 206). If test hash tag T'[i] does not match (equal) internal hash tag T[i], processing may proceed to step 80 of FIG. 4 as shown by path 214, and data stream 111 (and the corresponding bit stream 110) may be identified as inauthentic and discarded. If the computed test hash tag T'[i] matches (is equal to) internal hash tag T[i], processing may proceed to step 218 as shown by path 216.

At step 218, device 10 may process authentication block B[i] associated with hash tag T[i]. For example, device 10 may configure programmable logic circuitry using the bits of authentication block B[i] (e.g., plaintext blocks in authentication block B[i] as identified by original bit stream 110). In scenarios where authentication block B[i] includes ciphertext blocks $C_{i,j}$, device 10 may decrypt blocks $C_{i,j}$ using a cryptographic key to generate corresponding plaintext blocks $P_{i,j}$ that are used to configure the logic on device 10.

At step 220, device 10 may increment index i. At step 222, device 10 compare index i to the total number N of authentication blocks B[i] in data stream 111 to determine whether additional processing is needed. If index i is equal to N (e.g., as identified by auxiliary data $AUX_i$ associated with block B[i] or if no additional data in stream 111 is received), processing may end as shown by path 226. If index i is not equal to N (e.g., if device 10 continues to receive data from bit stream 111), processing may loop back to step 208 as shown by path 224 to authenticate the remaining authentication blocks in hash data stream 111 and to use the corresponding authentication blocks to configure the logic on device 10.

In this way, time and resources may be conserved if stream 111 is inauthentic, as only a portion of the stream needs to be processed if the stream is eventually found to be inauthentic (e.g., the remainder of the stream may be discarded if only a single authentication block is found to be inauthentic, thereby omitting additional processing time for processing the remainder of the stream). By performing the hashing operation in a reverse order with respect to the order in which the bit stream is provided to device 10 and authenticating the bit stream on an authentication-block-by-authentication-block basis as the bit stream is received, device 10 may be formed without excessive area-consuming buffering circuitry and without sacrificing the ability to ensure that the received bit stream is authentic and free from tampering or manipulation.

The foregoing is merely illustrative of the principles of this invention and various modifications can be made by those skilled in the art without departing from the scope and spirit of the invention. The foregoing embodiments may be implemented individually or in any combination.

What is claimed is:

1. A method of operating data stream generation circuitry to generate a hashed stream of data bits for loading onto an integrated circuit, the method comprising:
   receiving a stream of data bits having a leading end followed by a trailing end;
   generating a hash value for the stream of data bits, wherein the hash value is generated by performing a plurality of hashing operations on the obtained stream of data bits from the trailing end to the leading end of the stream of data bits; and appending the generated hash value to the leading end of the stream of data bits to generate the hashed stream of data bits that has the generated hash value appended to a leading end of the hashed stream of data bits.

2. The method defined in claim 1, further comprising:
partitioning the stream of data bits into at least first and second authentication blocks; and
generating an additional hash value based on at least the second authentication block, wherein generating the hash value further comprises generating the hash value based on at least the additional hash value.

3. The method defined in claim 2, wherein the first authentication block is located at the leading end and the second authentication block is located at the trailing end of the stream of data bits, wherein receiving the stream of data bits comprises:
receiving the leading end prior to the trailing end of the stream of data bits.

4. The method defined in claim 2, wherein the first authentication block comprises a first plurality of plaintext blocks, wherein the second authentication block comprises a second plurality of plaintext blocks, the method further comprising:
with a cryptographic engine on the data stream generation circuitry, encrypting the first plurality of plaintext blocks to generate a first plurality of ciphertext blocks; and
with the cryptographic engine, encrypting the second plurality of plaintext blocks to generate a second plurality of ciphertext blocks, wherein generating an additional hash value further comprises generating the additional hash value by performing a hashing operation on the second set of ciphertext blocks.

5. The method defined in claim 2, wherein the first authentication block is located at the leading end and the second authentication block is located at the trailing end of the stream of data bits, and wherein partitioning the stream of data bits into at least the first and second authentication blocks comprises partitioning the stream of data bits into at least the first, the second, and a third authentication block each having a common size, the method further comprising:
generating a third hash value based on at least the additional hash value.

6. The method defined in claim 5, wherein generating the hash value comprises performing a hashing operation on the third hash value and the first authentication block.

7. The method defined in claim 6, wherein generating the additional hash value comprises performing the hashing operation on at least the second authentication block.

8. The method defined in claim 7, wherein generating the additional hash value further comprises performing the hashing operation on the second authentication block and an auxiliary data field appended to the second authentication block.

9. The method defined in claim 1, further comprising:
generating a plurality of additional hash values such that the plurality of additional hash values are interspersed amongst the stream of data bits and wherein generating the hash value comprises generating the hash value based on at least each of the plurality of additional hash values.

10. The method defined in claim 9, further comprising:
encrypting the appended hash value using a cryptographic key.

11. The method defined in claim 10, wherein encrypting the appended hash value comprises:
encrypting the appended hash value using a private key of an asymmetric key pair without signing any of the additional hash values of the plurality of additional hash values.

12. The method defined in claim 11, further comprising:
providing the encrypted hash value to the integrated circuit;
providing the first authentication block to the programmable logic device subsequent to providing the encrypted hash value to the integrated circuit; and
providing the additional hash values of the plurality of additional hash values to the integrated circuit subsequent to providing the first authentication block to the integrated circuit.

13. A method of operating an integrated circuit, the method comprising:
receiving a first hash value of a data stream, wherein the data stream comprises first and second authentication blocks and wherein the first hash value is computed based on the first authentication block;
receiving the first authentication block of the data stream subsequent to receiving the first hash value;
receiving a second hash value of the data stream subsequent to receiving the first authentication block, wherein the second hash value is computed based on the second authentication block;
performing a hashing operation on the received first authentication block and the received second hash value to generate a test hash value; and
comparing the test hash value to the received first hash value to determine whether the first authentication block is authentic.

14. The method defined in claim 13, further comprising:
decrypting the first hash value using a cryptographic key to generate a decrypted first hash value; and
comparing the test hash value to the decrypted first hash value to determine whether the first authentication block is authentic.

15. The method defined in claim 13, wherein comparing the test hash value to the received first hash value to determine whether the first authentication block is authentic comprises:
identifying the first authentication block as authentic when the test hash value matches the received first hash value; and
identifying the first authentication block as inauthentic when the test hash value is different from the received first hash value.

16. The method defined in claim 15, further comprising:
receiving the second authentication block of the data stream subsequent to receiving the second hash value; and
receiving a third hash value of the data stream subsequent to receiving the second authentication block.

17. The method defined in claim 15, further comprising:
in response to identifying that the authentication block is authentic, performing the hashing operation on the second authentication block and the received third hash value to generate an additional test hash value; and
comparing the additional test hash value to the received third hash value to determine whether the second authentication block is authentic.

18. The method defined in claim 16, further comprising:
in response to identifying that the authentication block is inauthentic, discarding the second authentication block and the third hash value.

19. A method of operating logic design computing equipment, the method comprising:
partitioning a configuration data bit stream into at least first and second consecutive authentication blocks;
generating a first authentication tag for the second authentication block by performing a hashing operation on at least the second authentication block;
generating a second authentication tag for the first authentication block by performing the hashing operation on the first authentication tag and the first authentication block;
providing the second authentication tag to an integrated circuit; and
providing the first authentication block to the integrated circuit subsequent to providing the second authentication tag to the integrated circuit.

20. The method defined in claim 19, further comprising:
providing the first authentication tag to the integrated circuit subsequent to providing the first authentication block to the integrated circuit; and
providing the second authentication block to the integrated circuit subsequent to providing the first authentication tag to the integrated circuit.

21. The method defined in claim 20, wherein partitioning the configuration data bit stream into at least the first and second consecutive authentication blocks comprises partitioning the configuration data bits stream into at least the first, the second, and a third consecutive authentication blocks, the method further comprising:
generating a third authentication tag for the third authentication block by performing the hashing operation on at least the third authentication block;
generating the first authentication tag for the second authentication block by performing the hashing operation the second authentication block and the third authentication tag;
providing the third authentication tag to the integrated circuit subsequent to providing the second authentication block to the integrated circuit; and
providing the third authentication block to the integrated circuit subsequent to providing the third authentication tag to the integrated circuit.

22. The method defined in claim 19, further comprising:
digitally signing the second authentication tag using a cryptographic key.

23. The method defined in claim 22, further comprising:
encrypting the first and second authentication blocks using respective first and second additional cryptographic keys, wherein the first and second additional cryptographic keys are different from the cryptographic key.

* * * * *